(12) United States Patent
Leong et al.

(10) Patent No.: US 12,525,125 B2
(45) Date of Patent: Jan. 13, 2026

(54) METHOD, APPARATUS AND SYSTEM FOR ADAPTIVELY CONTROLLING TRAFFIC SIGNALS

(71) Applicant: NEC Corporation, Tokyo (JP)

(72) Inventors: Yew Chong Raymond Leong, Singapore (SG); Srihari Mohan, Singapore (SG)

(73) Assignee: NEC CORPORATION, Tokyo (JP)

( * ) Notice: Subject to any disclaimer, the term of this patent is extended or adjusted under 35 U.S.C. 154(b) by 48 days.

(21) Appl. No.: 18/294,639

(22) PCT Filed: Aug. 15, 2022

(86) PCT No.: PCT/JP2022/030914
§ 371 (c)(1),
(2) Date: Feb. 2, 2024

(87) PCT Pub. No.: WO2023/022136
PCT Pub. Date: Feb. 23, 2023

(65) Prior Publication Data
US 2024/0346925 A1 Oct. 17, 2024

(30) Foreign Application Priority Data
Aug. 20, 2021 (SG) ............... 10202109141Q

(51) Int. Cl.
*G08G 1/08* (2006.01)
*G06V 10/70* (2022.01)
*G06V 20/54* (2022.01)
*G08G 1/01* (2006.01)
*G08G 1/082* (2006.01)

(52) U.S. Cl.
CPC .............. *G08G 1/08* (2013.01); *G06V 10/70* (2022.01); *G06V 20/54* (2022.01); *G08G 1/0116* (2013.01); *G08G 1/0145* (2013.01); *G08G 1/082* (2013.01); *G06V 2201/08* (2022.01)

(58) Field of Classification Search
CPC ...... G08G 1/08; G08G 1/0116; G08G 1/0145; G08G 1/082; G06V 10/70; G06V 20/54; G06V 2201/08
See application file for complete search history.

(56) References Cited

FOREIGN PATENT DOCUMENTS

| | | | |
|---|---|---|---|
| GB | 2605991 A | * 10/2022 | ............ G06N 3/006 |
| JP | 2003-132490 A | 5/2003 | |
| JP | 2014035639 A | * 2/2014 | |
| JP | 2020-154958 A | 9/2020 | |
| JP | 7482008 B2 | * 5/2024 | |

OTHER PUBLICATIONS

International Search Report for PCT Application No. PCT/JP2022/030914, mailed on Sep. 20, 2022.
Written opinion for PCT Application No. PCT/JP2022/030914, mailed on Sep. 20, 2022.

* cited by examiner

*Primary Examiner* — Steven Lim
*Assistant Examiner* — James E Munion

(57) ABSTRACT

Present disclosure provides methods and apparatuses for adaptively controlling traffic signals. A method for adaptively controlling traffic signals based on a traffic control plan comprises identifying, by a processor, an external intervention occurring at an intersection, the external intervention causing traffic control behaviour at the intersection that deviates from the traffic control plan; and modifying, by the processor, the traffic control plan based on the traffic control behaviour caused by the external intervention.

11 Claims, 14 Drawing Sheets

METHOD, APPARATUS AND SYSTEM FOR ADAPTIVELY CONTROLLING TRAFFIC SIGNALS

This application is a National Stage Entry of PCT/JP2022/030914 filed on Aug. 15, 2022, which claims priority from Singapore patent application Ser. No. 10/202,109141Q filed on Aug. 20, 2021, the contents of all of which are incorporated herein by reference, in their entirety.

TECHNICAL FIELD

The present invention relates broadly, but not exclusively, to methods, apparatus and systems for adaptively controlling traffic signals.

BACKGROUND ART

Adaptive control systems such as SCOOT (Split Cycle Offset Optimization Technique) and SCATS (Sydney Coordinated Adaptive Traffic System) were first developed for adaptive phase control where traffic lights are switched through several phases in a cyclic sequence. Traffic engineers can manually select the phases and predefine their ordering in a cyclic sequence. These systems can make real time adjustments in the time between each phase, wherein the real time adjustments are based on measurements of traffic flow saturation levels.

Newer generations of Adaptive Traffic Signal Control (ATSC) systems are self-adaptive or self-learning. They are capable of detecting road incidents, predicting traffic flow and responding to the traffic situation. They are also integrated traffic management and control systems that perform coordinated optimization of a wider area of road network.

SUMMARY OF INVENTION

Technical Problem

However, these adaptive signal control systems rely on anticipated or predictable traffic flow patterns. When there is traffic congestion or obstruction, accidents or diversions on the roads, or when the traffic light signals are faulty, traffic police officers may direct traffic manually so that motorists are not confused. These traffic police officers are typically not receiving instructions from the concerned traffic signal control system, and are not pre-empting the system of his/her next actions in regards to traffic direction. Thus, such direction of traffic is not integrated to the concerned traffic management and control system, and as a result may undermine the effectiveness of the system.

Herein disclosed are embodiments of a device and methods for adaptively controlling traffic signals that addresses one or more of the above problems.

Furthermore, other desirable features and characteristics will become apparent from the subsequent detailed description and the appended claims, taken in conjunction with the accompanying drawings and this background of the disclosure.

Solution to Problem

In a first aspect, the present disclosure provides a method for adaptively controlling traffic signals based on a traffic control plan, comprising: identifying, by a processor, an external intervention occurring at an intersection, the external intervention causing traffic control behaviour at the intersection that deviates from the traffic control plan; and modifying, by the processor, the traffic control plan based on the traffic control behaviour caused by the external intervention.

In a second aspect, the present disclosure provides an apparatus for adaptively controlling traffic signals based on a traffic control plan, comprising: a memory in communication with a processor, the memory storing a computer program recorded therein, the computer program being executable by the processor to cause the apparatus at least to: identify an external intervention occurring at an intersection, the external intervention causing traffic control behaviour at the intersection that deviates from the traffic control plan; and modify the traffic control plan based on the traffic control behaviour caused by the external intervention.

In a third aspect, the present disclosure provides a system for adaptively controlling traffic signals, comprising the apparatus of the second aspect and at least one image capturing device.

The accompanying Figures, where like reference numerals may refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

BRIEF DESCRIPTION OF DRAWINGS

Embodiments of the invention will be better understood and readily apparent to one of ordinary skill in the art from the following written description, by way of example only, and in conjunction with the drawings, in which.

DESCRIPTION OF EMBODIMENTS

Terms Description

Figure 1:
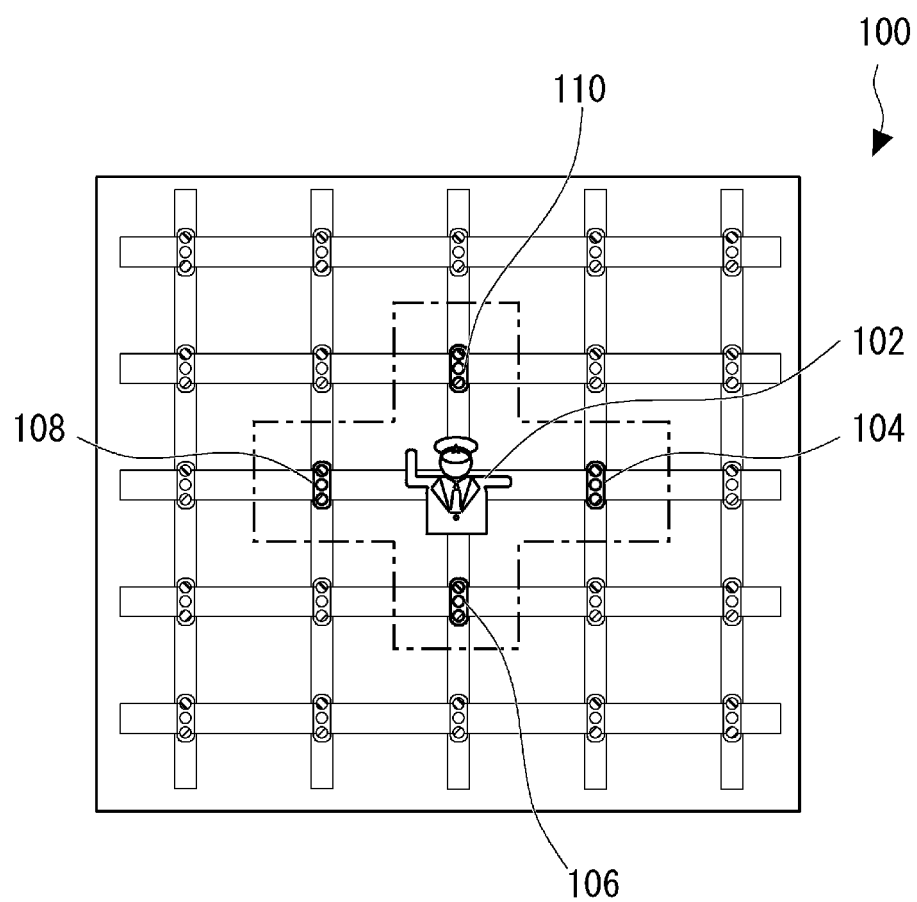
FIG. 1 shows an example illustration of a manual directing of traffic at an intersection according to various embodiments of the present disclosure.

An intersection refers to a traffic junction (for example a T-junction, a cross-junction, circular junction or any similar junction) at which a traffic control system is implemented to control traffic signals such that vehicles and pedestrians can safely and efficiently navigate the junction.

An adaptive traffic control system such as SCOOT and SCATS use adaptive phase control wherein traffic lights are switched through several phases in a cyclic sequence. For example, the traffic control system determines and implements an optimum duration in which a green light is on for vehicles to travel through or do a turn at the intersection, an optimum duration during which a green man signal is lit for pedestrians to cross the intersection, and other similar durations so that congestion of vehicles and traffic jams are minimised, while maintaining a high level of safety for both vehicles and pedestrians alike so that accidents are avoided.

Furthermore, these adaptive traffic control systems, unlike conventional traffic control systems, are able to make real time adjustments in the time between each phase, wherein the real time adjustments are based on the measurements of the traffic flow saturation levels. Newer ASTC systems can detect road accidents, predict traffic flow and respond to traffic situations in real time. Generally, these systems are implemented to perform coordinated optimization of traffic control for a wide area of road network which may comprise one or more intersections.

An external intervention refers to a factor external to a traffic control plan that causes traffic control behaviour that deviates from the traffic control plan. For example, an external intervention at an intersection may cause vehicles to cross or make a turn at the intersection when, based on the traffic control plan, they are not supposed to do so. In another example, an external intervention at an intersection may cause pedestrians to cross the road at the intersection when, based on the traffic control plan, they are not supposed to do so. The external intervention may include manual intervention such as a police officer or traffic safety personnel directing traffic, or accidents and other anomalies that can influence traffic flow.

DETAILED DESCRIPTION

Where reference is made in any one or more of the accompanying drawings to steps and/or features, which may have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which form public knowledge through their use. Such should not be interpreted as a representation by the present inventor(s) or the patent applicant that such devices in any way form part of the common general knowledge in the art.

Normally, controlling of traffic signals at an intersection may be executed by a traffic control system. The traffic control system may implement a traffic control plan at the intersection to control traffic signals at the intersection, as well as for neighbouring intersections of which the traffic control system covers. When an external intervention occurs at an intersection where a control plan exerted by the external intervention overrides an existing traffic control plan at the intersection, neighboring intersections of the intersection may not be optimized. For example, the external intervention may be a manual intervention by a traffic police or traffic safety personnel directing traffic at the intersection. In order to address this override issue, this "manual intervention" may be used as a new variable in the existing traffic control plan and also used as a constraint in traffic control plans for neighboring intersections.

Various prior arts have proposed techniques for predicting and maximizing traffic flow. However, such techniques require large amounts of data, and it is therefore unrealistic to assume that there is enough traffic flow data on external intervention situations (in particular where manual intervention is involved) to support this technique. Another proposed solution makes use of fuzzy logic to improve traffic signal control systems. However, this solution expects all traffic controllers at all intersections to be in good working condition to enjoy the benefit of such fuzzy logic-based adaptive signal control. Yet another proposed solution involves falling back to a local traffic signal control system in the event a centralized or regional traffic control system fails, but it does not take into account manual intervention by traffic police officers directing traffic manually, which is still a method used widely in many cities of the world.

FIG. 1 shows an example illustration 100 for manual directing of traffic at an intersection. A traffic control system such as a ATSC system may implement traffic control plans at one or more intersections for controlling traffic signals at the intersections. However, situations may arise where manual directing of traffic may occur for example at intersection 102, wherein a traffic police officer or any other traffic safety personnel directs traffic manually using, for example, hand signals to override traffic signal conditions at the intersection 102. Therefore, the manual directing of traffic occurring at intersection 102 may be detected and analysed, so that traffic control plans for a local region within the vicinity of the intersection may be adjusted accordingly.

For example, a traffic police officer or traffic safety personnel directing traffic at the intersection 102 may be detected by one or more video cameras. These cameras may capture images of the concerned person directing traffic at intersection 102 and, via video analytics or other similar techniques, analyse the captured images to determine the control plan implemented by the person. This control plan may then be integrated into the traffic control plan being implemented by the traffic control system for the intersection 102, such that the traffic control plan is modified or adjusted based on the control plan of the manual traffic directing. The adjusted traffic control plan delivers predictable traffic flow patterns to the traffic control system, and become adaptive constraints for optimization of traffic control. Advantageously, the manual directing of traffic at intersection 102 is thus incorporated into the traffic control plans of the traffic control system as a variable, enabling the system to be more adaptive to real life conditions for implementing efficient traffic control plans.

Further, traffic control plans for neighbouring intersections such as, for example, 104, 106, 108 and 110 that are within a local region of the intersection 102 are also adjusted or modified based on the control plan of the manual traffic directing. This advantageously reduces the impact of the manual traffic directing around the local region of the intersection 102. It will be appreciated that traffic control plans for other intersections that are further away from intersection 102 may also be adjusted or modified accordingly.

Figure 2:
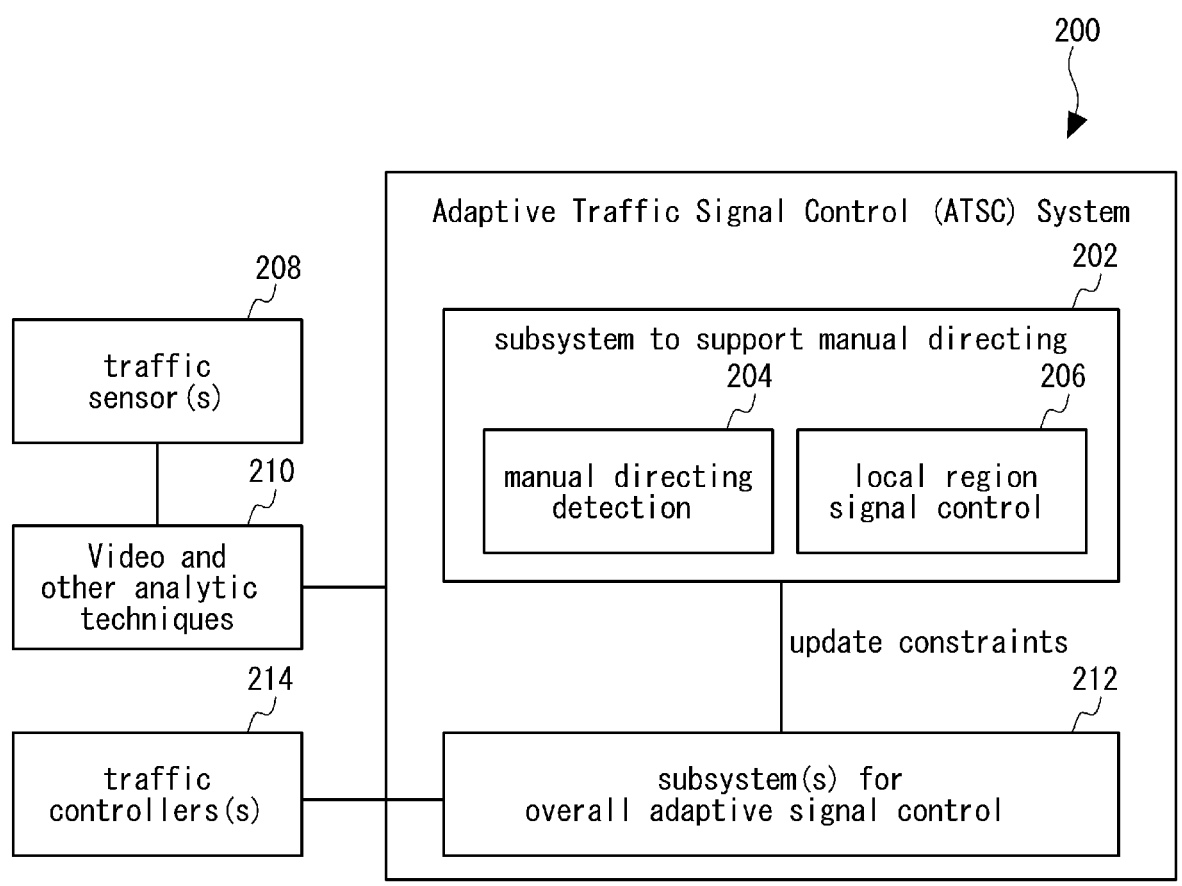
FIG. 2 illustrates a schematic diagram of an adaptive traffic signal control system according to various embodiments of the present disclosure.

FIG. 2 illustrates a schematic diagram of an example ATSC system 200 according to various embodiments of the present disclosure. The ATSC system may comprise a subsystem 202 to support manual directing comprising a manual directing detection module 204 and a local region signal control module 206. Traffic sensor(s) 208 such as video/surveillance/CCTV cameras may capture video and/or images in real-time of an intersection covered by the ATSC system and provide the captured video as input to an analytic module 210 wherein video and other analytic techniques may be used to process the captured video or images. The processed video or images are then provided as input to the subsystem 202, wherein information of a control plan and/or traffic flow of the intersection may then be determined based on the processed video or images. The determined information are then provided as input to a subsystem 212 for overall adaptive signal control, wherein the provided information are used as update constraints or variables to modify or adjust a traffic control plan implemented at the intersection by the ATSC system 200. The modified or adjusted traffic control plan is then implemented by a traffic controller(s) module 214 which then controls traffic signals at the intersection based on the modified or adjusted traffic control plan.

It will be appreciated that traffic control plans for more than one intersections may be done in real-time. Further, it is also possible for the traffic control system to comprise a single processor that can perform the functions of at least the subsystems 202, 204, 206, 210 and 212, such as for identifying an external intervention occurring at an intersection, the external intervention causing traffic control behaviour at the intersection that deviates from a traffic control plan of the intersection, and modifying the traffic control plan based on the traffic control behaviour caused by the external intervention.

Methods for detecting manual directing of traffic at an intersection may include detecting, via video analytics, the presence of traffic police officers or other traffic safety personnel directing traffic. To improve the accuracy of detection, supporting methods may be implemented, such as anomaly detection via comparison of a current traffic flow (from sensors like induction loop, lidar, video, etc) against a current traffic signal control (issued by a traffic control system such as an ATSC system). Another way to improve detection accuracy may be an implementation of automatic fault detection or monitoring system for traffic lights to ascertain that the traffic lights at the intersection are functioning properly.

Figure 3:
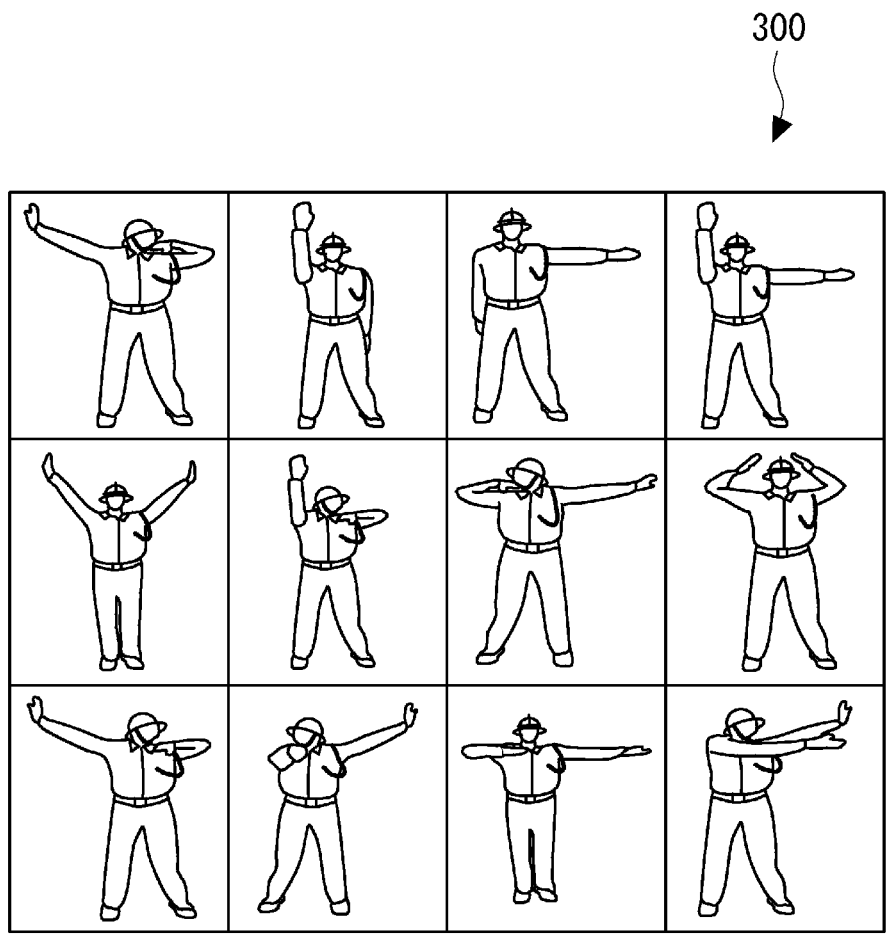
FIG. 3 illustrates examples of traffic directing hand signals according to various embodiments of the present disclosure.

A video obtained from a video/surveillance/CCTV camera is usually stored in mpg or any video codec format. Each video can be read and split into multiple frames per video. Through video analytic techniques known in the art, captured videos of possible external intervention at an intersection obtained from a video/surveillance/CCTV camera may be processed for detection of manual intervention, for example for detection of a police officer or other traffic safety personnel directing traffic at the intersection. Labeling may be done for traffic police (especially those who wear a police uniform, a police badge or ID tag), other traffic safety personnel (for example, a person wearing a safety vest, safety helmet, holding a baton, or having other similar characteristics) and also for hand signals. FIG. 3 shows an illustration 300 of common hand signals that may be used for directing traffic, and which video analytic techniques may be utilized to detect. For example, an object detection method such as Region Based Convolutional Neural Networks (RCNN), Detectron, You Only Look Once (YOLO) or other similar methods can be applied to detect the hand signs used during the manual intervention. A sequence in which these hand signs are used, as well as a time duration of which each hand sign is used may also be determined. These information may then be used to determine a control plan that the manual intervention is applying at the intersection.

Figure 4:
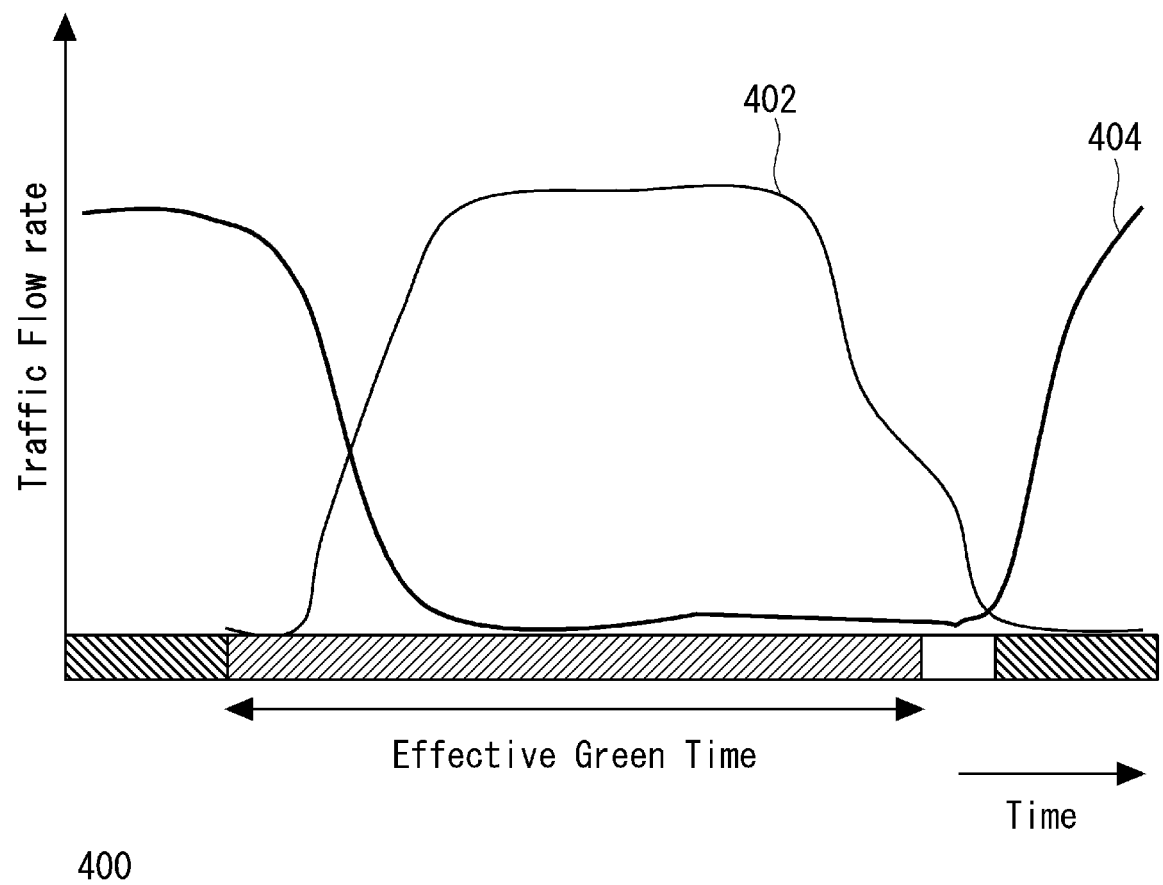
FIG. 4 depicts a graph illustrating traffic flow according to various embodiments of the present disclosure.

There may arise situations in which we are unable to detect the hand signals using video analytics, or an external/manual intervention is not seen to be present in the intersection, or that the person directing traffic at the intersection cannot be seen clearly. In such cases, we may use anomaly detection techniques to check the manual intervention. For example, an anomaly detection method know in the art may be used to detect any abnormal change in traffic flow patterns, which can assist in identifying any faulty intersections and the resultant traffic flow. Referring to graph 400 of FIG. 4, a regular traffic flow for an intersection during a day may be represented by line 402, and a current traffic flow for the intersection may be represented by line 404. An anomaly may be detected for line 404, seen in an abnormally high traffic flow during a red traffic signal (i.e., when vehicles are supposed to stop and traffic flow should thus be low) and/or an abnormally low traffic flow during a green traffic signal (i.e., when vehicles are supposed to move and traffic flow should thus be high) which deviates from the regular traffic flow as shown in line 402. This anomaly may be determined to be an abnormal change in the traffic flow pattern. Further investigation of the situation at the intersection may then be required. Advantageously, with the anomaly detection method, we can estimate a control plan caused by the external/manual intervention based on the traffic flow pattern and other traffic variables. This can be done using machine learning approach.

Figure 5:
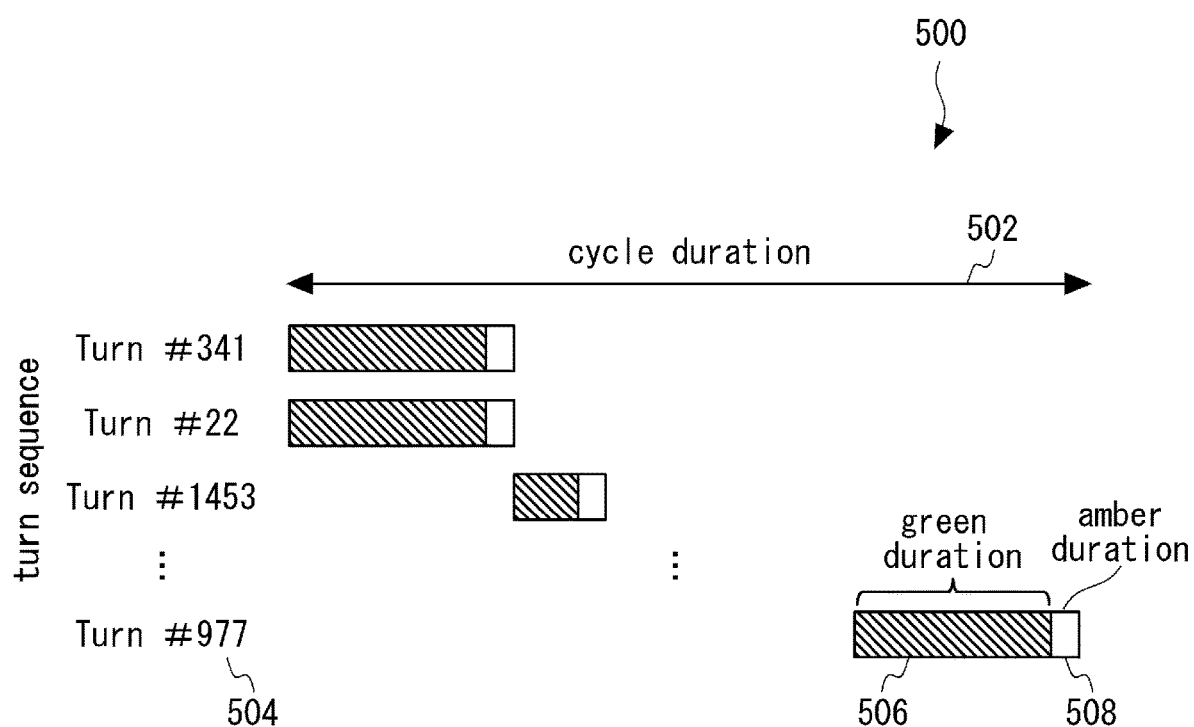
FIG. 5 depicts an illustration of an example control plan executed by manual directing of traffic according to various embodiments of the present disclosure.

Sensor information may be used to understand a control plan executed by manual directing from a most recent 1 or multiple cycles of a traffic light sequence. For example, information such as cycle start time, cycle duration, green light duration, amber light duration, turn sequence and other similar information may be obtained to determine a control plan executed by a manual or external intervention. These information may be presented as shown in diagram 500 of FIG. 5. For example, in a cycle duration 502, turn sequence 504 may occur at a green light duration 506 and an amber light duration 508. These information may be coupled with traffic flow information of turn sequence 504 as well as all other sequences in the cycle duration 502 to estimate a control plan executed by the external intervention. For example, sensor information may be utilised to understand the sequence of turn events (as depicted in turn sequence 504) and their duration (as depicted in green light duration 506 and amber light duration 508), so that a control plan may be estimated.

Figure 6A:
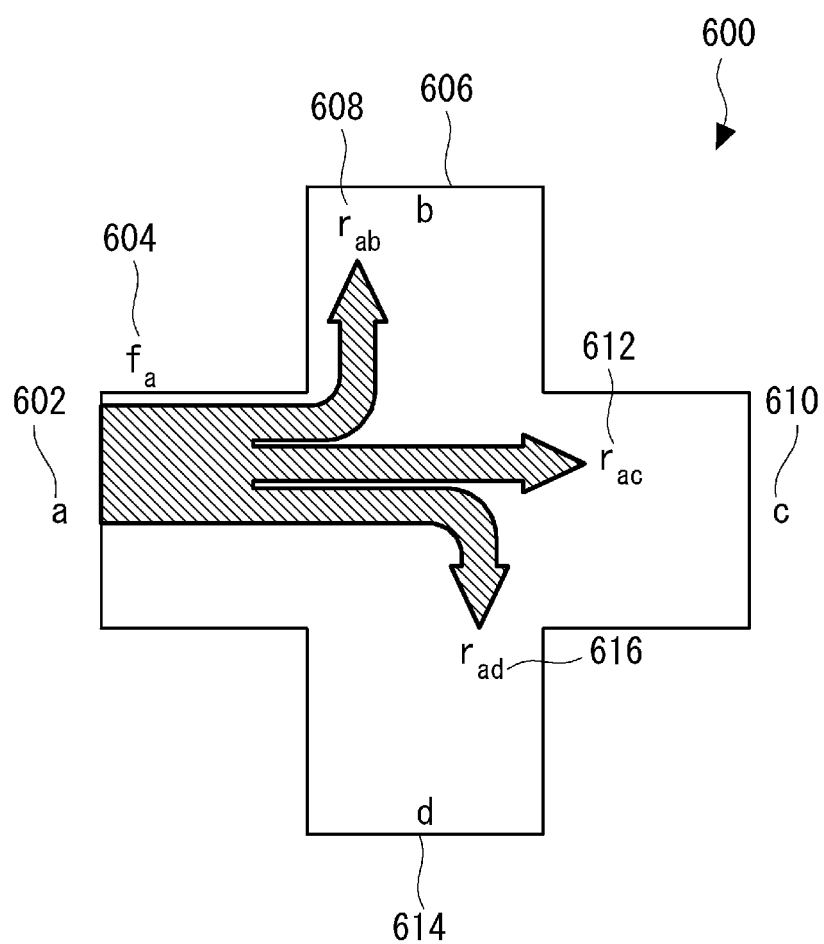
FIG. 6A illustrates an example of flow rates and turn ratios at an intersection according to various embodiments of the present disclosure.
Figure 6B:
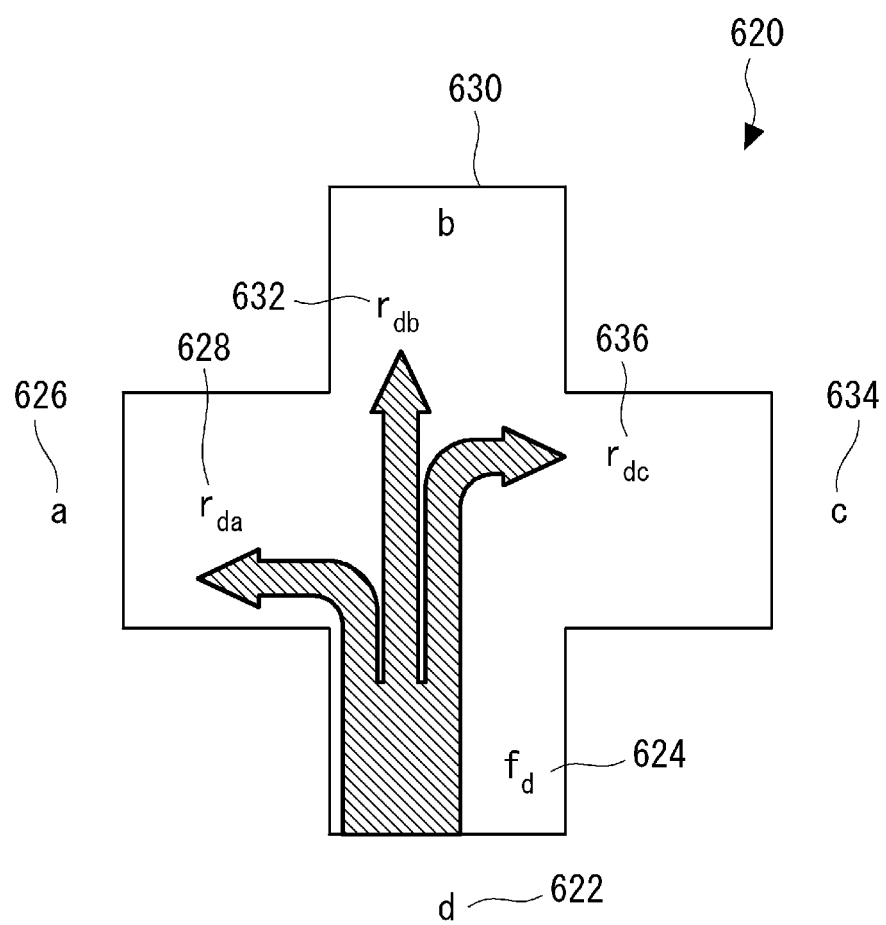
FIG. 6B illustrates an example of flow rates and turn ratios at an intersection according to various embodiments of the present disclosure.

Sensor information may also be used to understand current traffic situations from a most recent 1 or multiple cycles of a traffic light sequence. For example, information such as flow rate f, turn ratio r and other similar information may be obtained to determine a control plan executed by a manual or external intervention. These information may be presented as shown in diagram 600 of FIG. 6A and diagram 610 of FIG. 6B. For example, diagram 600 shows traffic flow from side a 602 with a flow rate 604, which turns left into side b 606 with a turn ratio 608, goes straight to side c 610 with a turn ratio 612, and turns right to side d 614 with a turn ratio 616. Diagram 620 shows traffic flow from side d 622 with a flow rate 624, which turns left into side a 626 with a turn ratio 628, goes straight to side b 630 with a turn ratio 632, and turns right to side c 634 with a turn ratio 636.

Figure 7A:
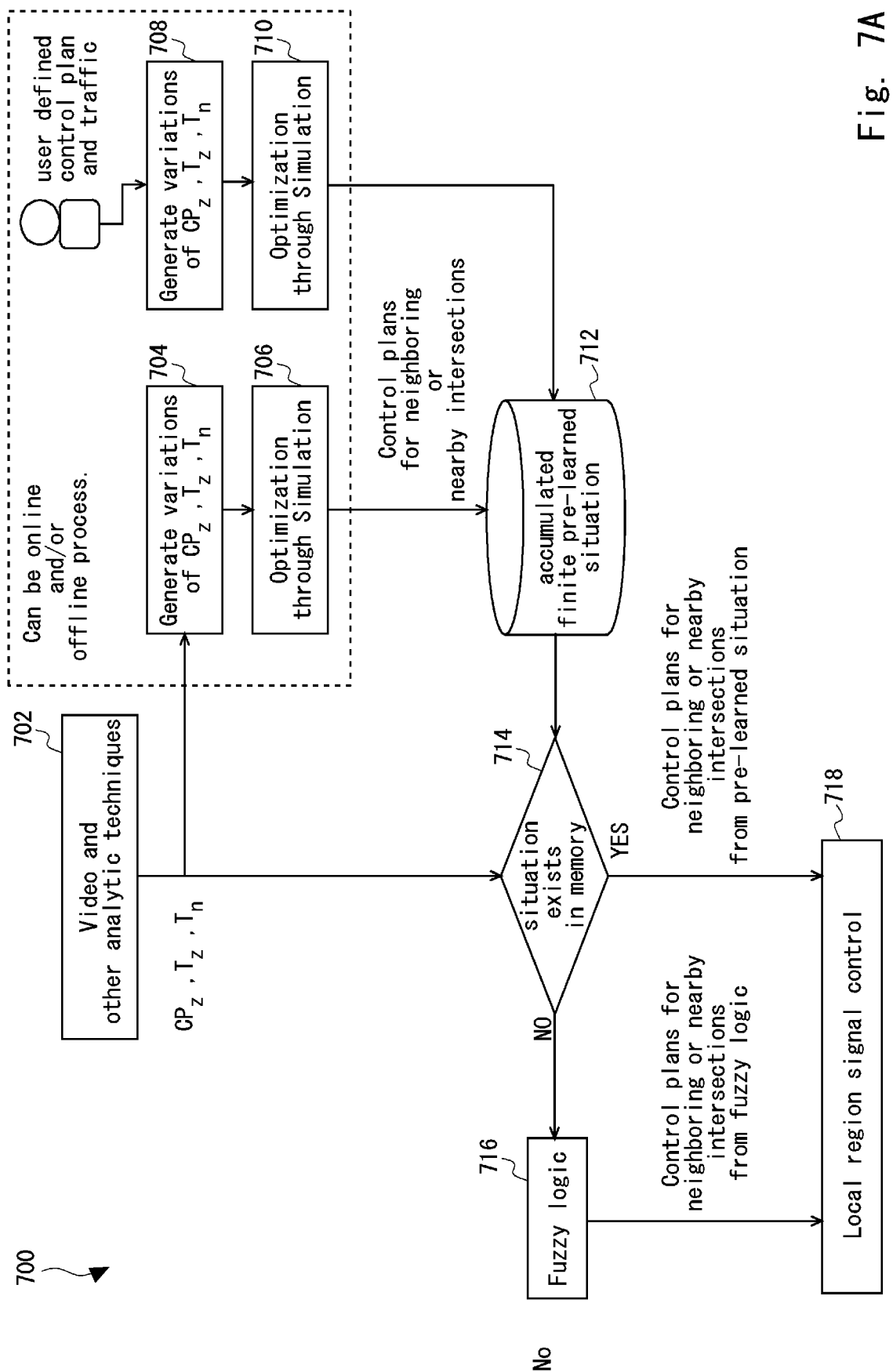
FIG. 7A illustrates an example flowchart for adaptive traffic control according to various embodiments of the present disclosure.

FIG. 7A illustrates an example flowchart 700 for adaptive traffic control based on simulation according to various embodiments of the present disclosure. For example, an intersection z may be under external intervention. Through a process 702 utilizing video and other analytic techniques, it may be determined that the external intervention is executing a control plan represented by $CP_z$ with the intersection z having traffic (i.e., having traffic flow rate(s) and turn ratio(s)) represented by $T_z$. Further, traffic (for example, represented by $T_n$) for each of one or more neighbouring intersections situated around intersection Z may also be determined in process 702 utilizing video and other analytic techniques. Information of the control plan $CP_z$, the traffic $T_z$ and traffic $T_n$ are input to a process 704 wherein variations of control plan $CP_z$, traffic $T_z$ and traffic $T_n$ are generated. These variations then undergo a simulation process 706 to simulate possible traffic conditions and corresponding control plans $CP_n$ for neighbouring or nearby intersections of intersection z based on each variation of control plan $CP_z$, traffic $T_z$ and traffic $T_n$. Alternatively, user defined control plan $CP_z$, traffic $T_z$ and traffic $T_n$ may be provided instead for the simulations. Information of the user defined control plan and traffic are then input to a process 708 wherein further variations of (user defined) control plan $CP_z$, traffic $T_z$ and traffic $T_n$ are generated, and these generated variations then undergo a simulation process 710 to simulate possible traffic conditions and corresponding control plans $CP_n$ for neighbouring or nearby intersections of intersection z based on each variation. It will be appreciated that processes 704, 706, 708 and 710 may be implemented as online (e.g., in real time connection with the traffic control system) and/or offline processes.

Simulation results of $CP_n$ and their corresponding inputs (control plan $CP_z$, traffic $T_z$ and traffic $T_n$) from process 706 and 710 are then stored in a database 712 as accumulated pre-learned situations that can be referenced by an adaptive traffic control system to determine suitable control plans for neighbouring intersections of intersection Z. In other words, the accumulated pre-learned situations may be saved data from past simulations of traffic conditions for intersection Z as well as neighbouring or nearby intersections of intersection z (or another intersection that may be similar in circumstances or location to intersection z) based on previously encountered or previous user-defined control plans and traffic parameters. For example, values of control plan $CP_z$, traffic $T_z$ and traffic $T_n$ for a current situation may be obtained from process 702 utilizing video and other analytic techniques and provided as input into process 714, wherein these inputs are compared with the accumulated pre-learned situations (e.g., previous simulation results of $CP_n$ and their corresponding inputs comprising previously obtained values of control plan $CP_z$, traffic $T_z$ and traffic $T_n$) that are previously simulated and stored in database 712. If it is determined in process 714 that accumulated pre-learned situations resembling the current situation exists (e.g., previously stored values of control plan $CP_z$, traffic $T_z$ and traffic $T_n$ are found to resemble the currently obtained values of control plan $CP_z$, traffic $T_z$ and traffic $T_n$), a pre-learned situation that best resembles the the current situation is determined and input into process 718, wherein suitable pre-learned control plans (e.g., control plans $CP_n$ of the determined pre-learned situation) are then applied to neighbouring or nearby intersections of intersection z. If it is determined in process 714 that no suitable accumulated pre-learned situation exist, fuzzy logic in process 716 may be implemented to determine suitable control plans for neighbouring intersections. Fuzzy logic refers to a non-linear mapping of input to get a scalar output. It is a set of rules that can be used to determine an optimal control plan for a concerned neighbouring intersection based on a control plan $CP_z$, traffic $T_z$ and traffic $T_n$. For example, fuzzy logic may be utilized when a suitable pre-learned control plan is not available for retrieval in the database 712. In this case, the external intervention which has a set of control plan $CP_z$ is used as a parameter to determine an optimal control plan for the neighbouring intersection. traffic $T_z$ and traffic $T_n$ may also be included as input parameters to determine the optimal control plan via fuzzy logic. the determined optimal control plan may then be applied to the concerned neighbouring intersection, or stored as a pre-learned control plan $CP_n$ with the control plan of the external intervention, the resultant traffic flow at the intersection and the traffic flow at the neighbouring intersection as corresponding simulation inputs. The determined control plans are then input into process 718 for application to neighbouring or nearby intersections of intersection z. Advantageously, process 714 provides a fallback position in case a pre-learned situation that best resembles a current traffic situation is not available.

Figure 7B:
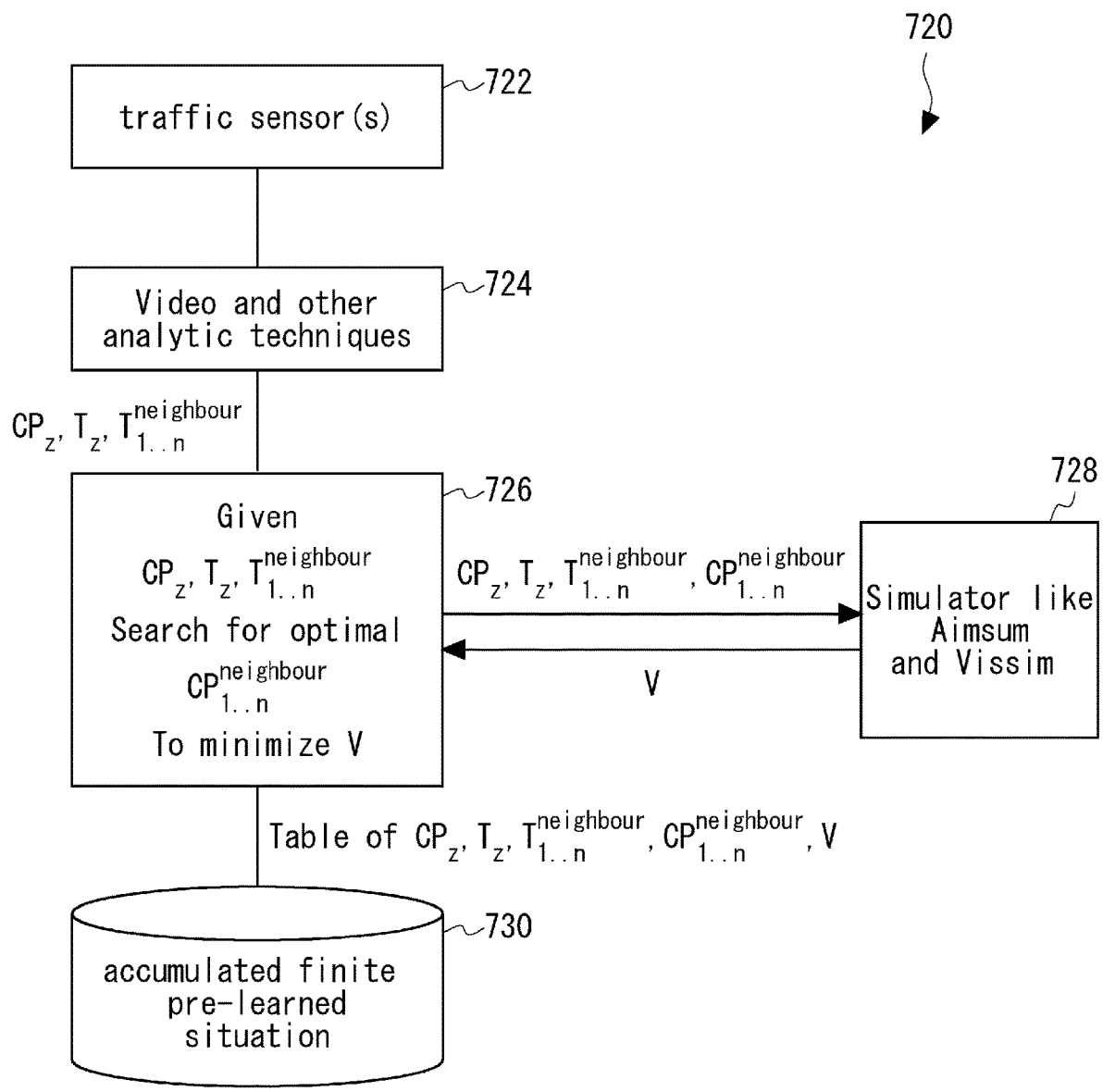
FIG. 7B illustrates an example flowchart for adaptive traffic control according to various embodiments of the present disclosure.

FIG. 7B illustrates another example flowchart 720 for adaptive traffic control based on simulation according to various embodiments of the present disclosure. For example, an intersection z may be under external intervention. Sensor information of cycle start time, cycle duration, green light duration, amber light duration, turn sequence and other similar information at the intersection z may be obtained via traffic sensors in a process 722. The sensor information may further include information of cycle start time, cycle duration, green light duration, amber light duration, turn sequence and other similar information from other intersections that are, for example, neighbouring to intersection z.

Through a process 724 utilizing video and other analytic techniques to analyze the sensor information, it may be determined that the external intervention is executing a control plan represented by $CP_z$ with the intersection z having traffic (i.e., having traffic flow rate(s) and turn ratio(s)) represented by $T_z$. Further, traffic $$T_{1\ldots n}^{neighbour}$$

of 1 up to n numbers of intersections that are for example neighbouring to intersection z may also be determined. Information of the control plan $CP_z$, the traffic $T_z$ and $$T_{1\ldots n}^{neighbour}$$

are input to a process 726 in order to determine an optimal control plan $$CP_{1\ldots n}^{neighbour}$$

for each of the 1 to n intersections. An optimal control plan $$CP_{1\ldots n}^{neighbour}$$

may be one that minimises a value V. Simulation may be performed in a process 728 using the parameters $CP_z$, $T_z$, $$T_{1\ldots n}^{neighbour}$$

and a testing value of $$CP_{1\ldots n}^{neighbour}$$

using simulators such as Aimsum, Vissim, or other similar simulators, and a resultant value 'V' is derived from the simulation. 'V' may be an objective function which has a scalar output, wherein the aim is to get a value of 'V' that indicates an optimal overall traffic condition. For example, 'V' may be derived as a function for travel time and the value should be minimized in the simulation. This simulation is repeated using a different test value of $$CP_{1\ldots n}^{neighbour}$$

for each of the 1 to n intersections until a minimized value of V is obtained for each of the 1 to n intersections. The values of parameters $CP_z$, $T_z$, $$T_{1\ldots n}^{neighbour}$$

$$CP_{1\ldots n}^{neighbour}$$

and corresponding V values may be stored in a process 730 as accumulated finite pre-learned situations that may be used as reference for future abnormal events that may occur in the traffic control system. The parameters may be compiled as a table for storing in any form of memory, for example in a database. This advantageously enables the traffic control system to accumulate a database of previous events that may be utilized for future events, improving adaptability and efficiency of the system in handling abnormal traffic situations.

Figure 7C:
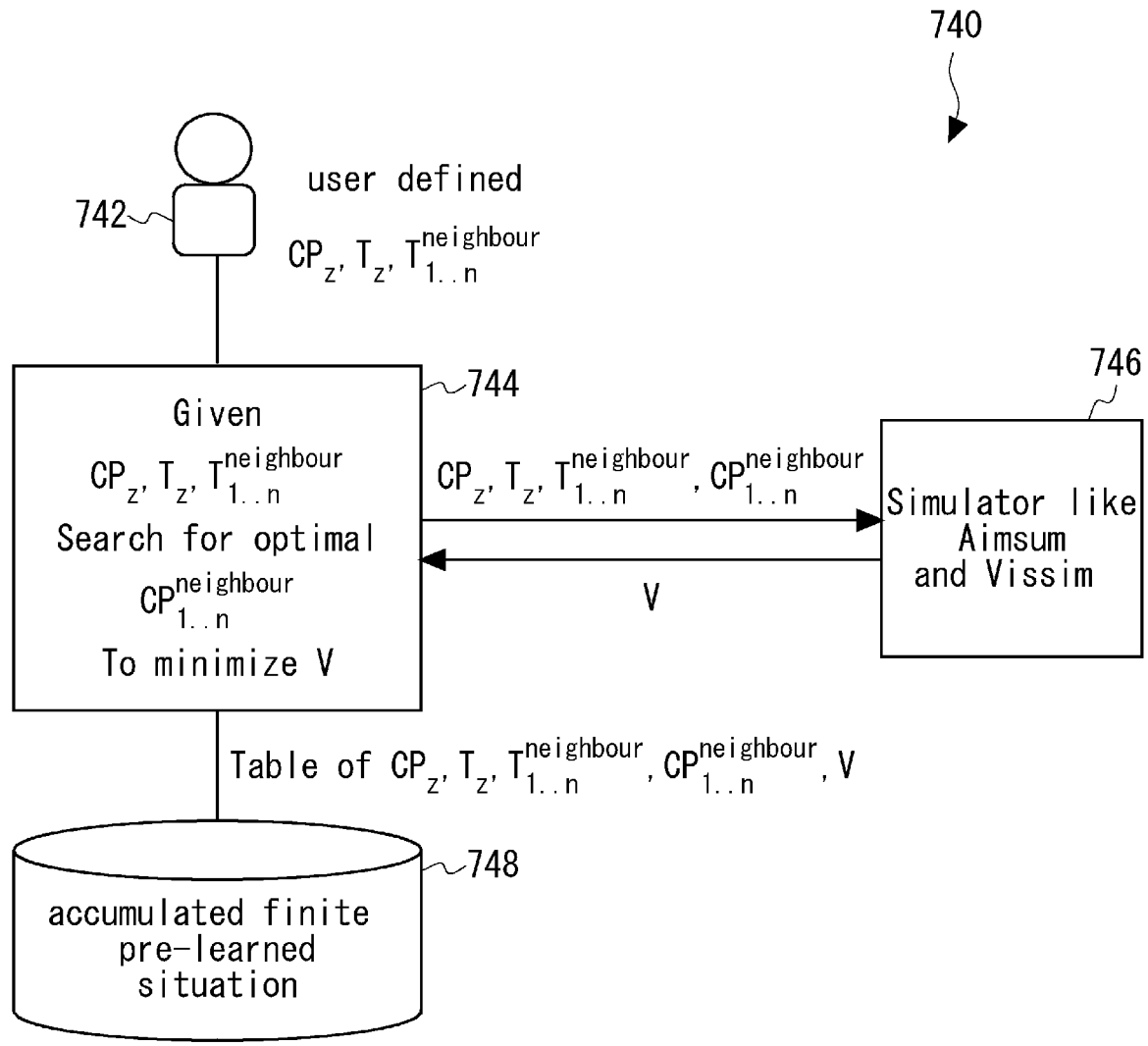
FIG. 7C illustrates an example flowchart for adaptive traffic control according to various embodiments of the present disclosure.

FIG. 7C illustrates another example flowchart 740 for adaptive traffic control based on simulation according to various embodiments of the present disclosure. While the process depicted in flowchart 740 is identical to that shown in flowchart 720, user defined inputs for parameters $CP_z$, $T_z$ and $$T_{1\ldots n}^{neighbour}$$

are generated at process 742 and utilized for the simulations, instead of being obtained from sensor information i.e., in processes 722 and 724. Advantageously, this implementation enables simulations of potential abnormal situations to be performed in an offline manner. For example, the simulations may be performed in an isolated and offline manner separately from the traffic control system, so that the traffic control system can still continue with the daily traffic monitoring.

Figure 7D:
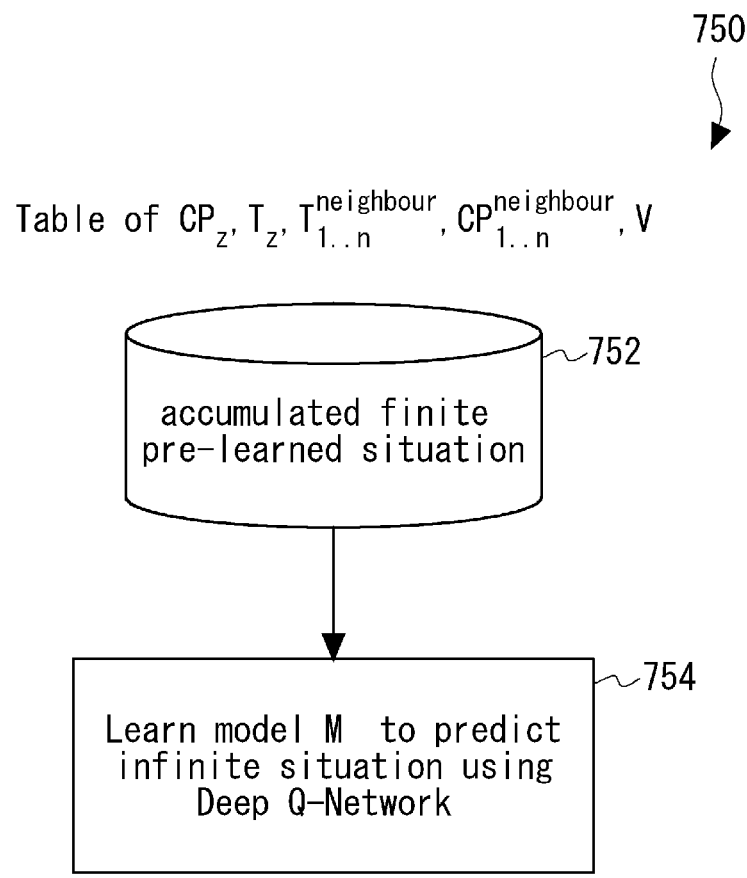
FIG. 7D illustrates an example flowchart for adaptive traffic control according to various embodiments of the present disclosure.

FIG. 7D illustrates another example flowchart 750 for adaptive traffic control based on simulation according to various embodiments of the present disclosure. Based on the compiled simulation results with parameters $CP_z$, $T_z$, $$T_{1\ldots n}^{neighbour}$$

$$CP_{1\ldots n}^{neighbour}$$

and V into the accumulated finite pre-learned situations in process 730 of flowchart 720 and/or process 748 of flowchart 740 (shown in this flowchart as process 752), the traffic control system may learn a model M for predicting an infinite possibility of situations in a process 754 utilizing, for example, Deep Q-Network. This model M may be advantageously utilized for enhanced adaptability of the traffic control system, especially when dealing in abnormal situations which were not previously encountered before by the system. It will be appreciated that flowcharts 720 and 740 may be further followed up with process 754 for developing the model M for adaptive traffic control.

Figure 7E:
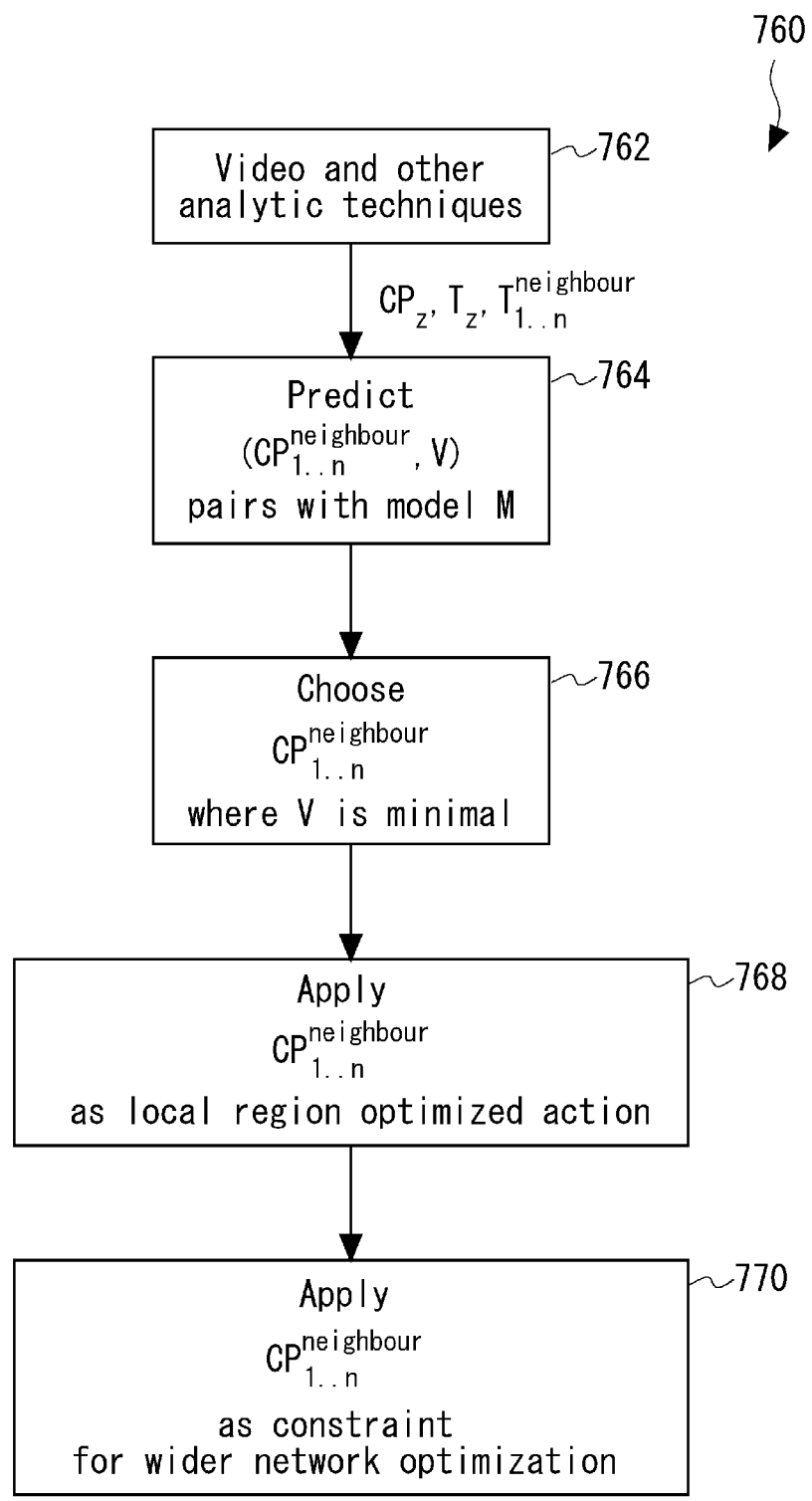
FIG. 7E illustrates an example flowchart for adaptive traffic control according to various embodiments of the present disclosure.

FIG. 7E illustrates an example flowchart 760 for how model M may be utilised for adaptive traffic control based on simulation according to various embodiments of the present disclosure. In a process 762 similar to process 724 of flowchart 720, video and other analytic techniques are applied to obtain parameters $CP_z$, $T_z$ and $$T_{1\ldots n}^{neighbour}$$

These parameters are input into a process 764 to predict (CP $$CP_{1\ldots n}^{neighbour},$$

V) pairs with model M as developed in process 754 of flowchart 750. In a next process 756, a $$CP_{1\ldots n}^{neighbour}$$

value is selected for each of the 1 to n intersections where V is minimal. In a next process 768, the selected $$CP_{1\ldots n}^{neighbour}$$

are applied as an optimised action, wherein each of the 1 to n intersections that are neighbouring to intersection z are reconfigured to adopt the selected $$CP_{1\ldots n}^{neighbour}$$

In a next process 770, the selected $$CP_{1\ldots n}^{neighbour}$$

may be further applied to Model M as a constraint for wider network optimization, for example to intersections that are further away from intersection Z.

Figure 8:
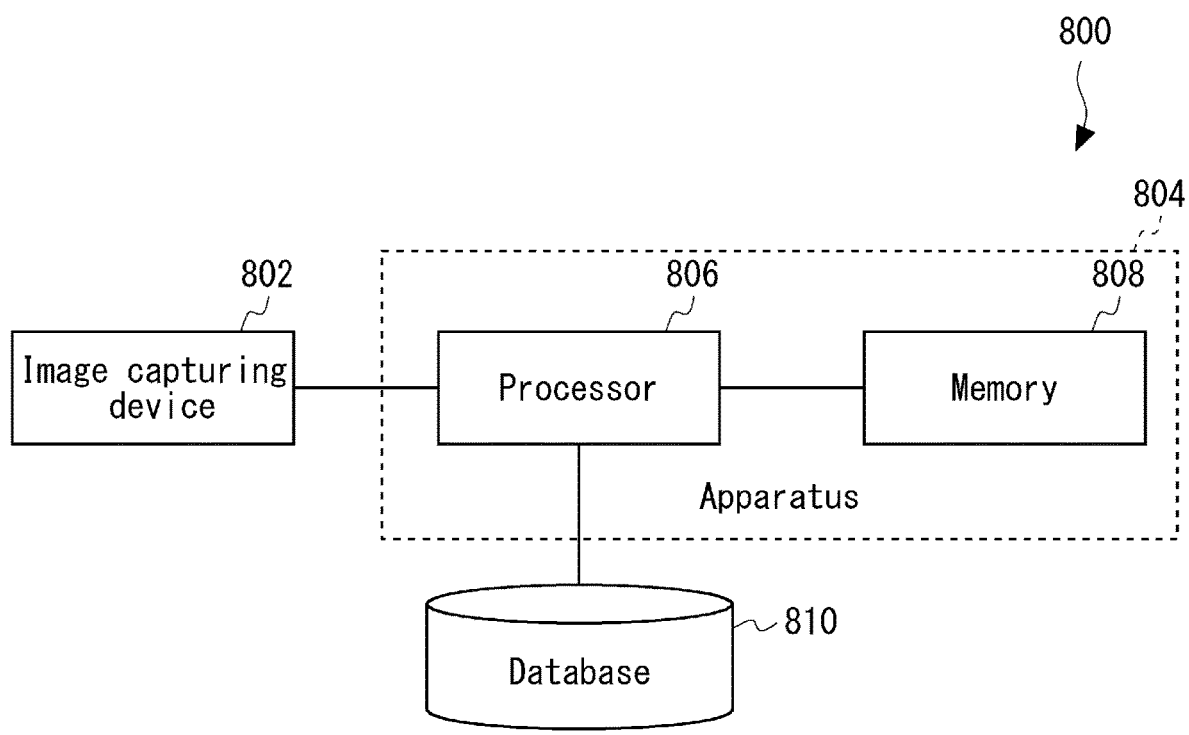
FIG. 8 depicts a block diagram illustrating a system for adaptive traffic control according to various embodiments of the present disclosure.

FIG. 8 depicts a block diagram illustrating a system 800 for adaptive traffic control according to various embodiments. In an example, the managing of video or image input is performed by at least an image capturing device 802 and an apparatus 804. The system 800 comprises an image capturing device 802 in communication with the apparatus 804. In an implementation, the apparatus 804 may be generally described as a physical device comprising at least one processor 806 and at least one memory 808 including computer program code. The at least one memory 808 and the computer program code are configured to, with the at least one processor 806, cause the physical device to perform the operations described in FIGS. 2 and 7. The processor 806 is configured to receive an image from the image capturing device 802 or to retrieve an image from a database 810.

The video or image capturing device 802 may be a device in which a video or image can be input. For example, a digital video can be input, or a physical medium containing a digital video (i.e., a storage drive, DVD, VCD, and other similar medium) or analogue video (i.e., a video cassette or other similar medium) can be input such that the video or plurality of images obtained from the video is scanned and used as an input. The image capturing device may also be a video/CCTV/surveillance camera with which a video can be captured and used as an input for the apparatus 804.

The apparatus 804 may be configured to communicate with the image capturing device 802 and the database 810. The database may comprise software and/or an operating system for the apparatus 804 and system 800, and may also comprise saved data of pre-learned situations as described in FIG. 7. In an example, the apparatus 804 may receive, from the image capturing device 802, or retrieve from the database 810, an input video or plurality of images from the video of an intersection, and after processing the input video or plurality of images from the video by the processor 806 in apparatus 804, identify an external intervention occurring at the intersection, the external intervention causing traffic control behaviour at the intersection that deviates from an existing traffic control plan of the intersection. The apparatus 804 may also be configured to modify the existing traffic control plan based on the traffic control behaviour caused by the external intervention.

Figure 9:
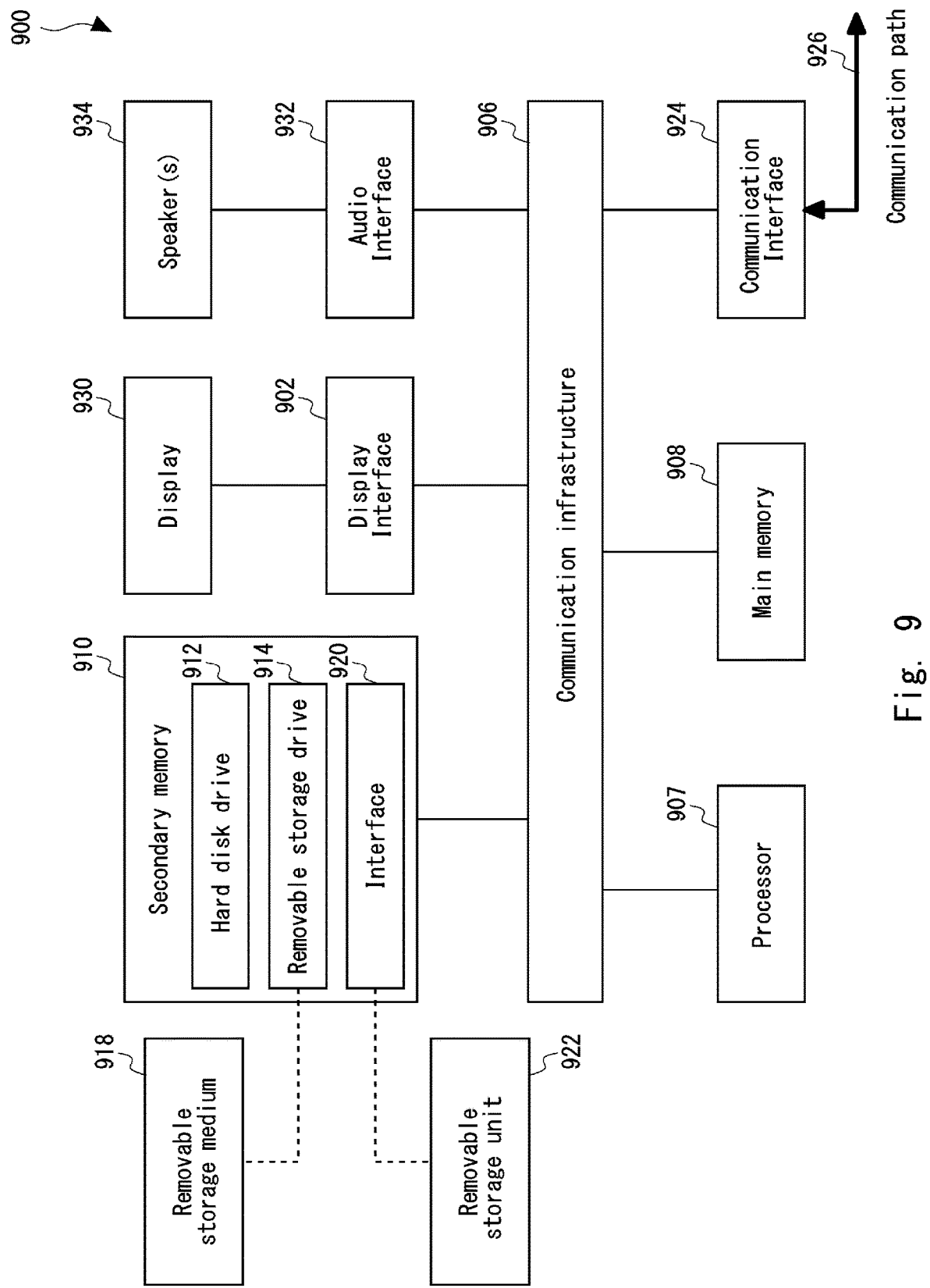
FIG. 9 depicts an exemplary computing device that may be used to execute the methods of the earlier figures.

FIG. 9 depicts an exemplary computing device 900, hereinafter interchangeably referred to as a computer system 900 or as a device 900, where one or more such computing devices 900 may be used to implement the system 800 shown in FIG. 8 or the method of the earlier figures. The following description of the computing device 900 is provided by way of example only and is not intended to be limiting.

As shown in FIG. 9, the example computing device 900 includes a processor 907 for executing software routines. Although a single processor is shown for the sake of clarity, the computing device 900 may also include a multi-processor system. The processor 907 is connected to a communication infrastructure 906 for communication with other components of the computing device 900. The communication infrastructure 906 may include, for example, a communications bus, cross-bar, or network.

The computing device 900 further includes a primary memory 908, such as a random access memory (RAM), and a secondary memory 910. The secondary memory 910 may include, for example, a storage drive 912, which may be a hard disk drive, a solid state drive or a hybrid drive and/or a removable storage drive 914, which may include a magnetic tape drive, an optical disk drive, a solid state storage drive (such as a USB flash drive, a flash memory device, a solid state drive or a memory card), or the like. The removable storage drive 914 reads from and/or writes to a removable storage medium 918 in a well-known manner. The removable storage medium 918 may include magnetic tape, optical disk, non-volatile memory storage medium, or the like, which is read by and written to by removable storage drive 914. As will be appreciated by persons skilled in the relevant art(s), the removable storage medium 918 includes a computer readable storage medium having stored therein computer executable program code instructions and/or data.

In an alternative implementation, the secondary memory 910 may additionally or alternatively include other similar means for allowing computer programs or other instructions to be loaded into the computing device 900. Such means can include, for example, a removable storage unit 922 and an interface 920. Examples of a removable storage unit 922 and interface 920 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 922 and interfaces 920 which allow software and data to be transferred from the removable storage unit 922 to the computer system 900.

The computing device 900 also includes at least one communication interface 924. The communication interface 924 allows software and data to be transferred between computing device 900 and external devices via a communication path 926. In various embodiments of the inventions, the communication interface 924 permits data to be transferred between the computing device 900 and a data communication network, such as a public data or private data communication network. The communication interface 924 may be used to exchange data between different computing devices 900 which such computing devices 900 form part an interconnected computer network. Examples of a communication interface 924 can include a modem, a network interface (such as an Ethernet card), a communication port (such as a serial, parallel, printer, GPIB, IEEE 1394, RJ45, USB), an antenna with associated circuitry and the like. The communication interface 924 may be wired or may be wireless. Software and data transferred via the communication interface 924 are in the form of signals which can be electronic, electromagnetic, optical or other signals capable of being received by communication interface 924. These signals are provided to the communication interface via the communication path 924.

As shown in FIG. 9, the computing device 900 may further include a display interface 902 which performs operations for rendering images or video to an associated display 930 and an audio interface 932 for performing operations for playing audio content via associated speaker(s) 934.

As used herein, the term "computer program product" (or computer readable medium, which may be a non-transitory computer readable medium) may refer, in part, to removable storage medium 918, removable storage unit 922, a hard disk installed in storage drive 912, or a carrier wave carrying software over communication path 926 (wireless link or cable) to communication interface 924. Computer readable storage media (or computer readable media) refers to any non-transitory, non-volatile tangible storage medium that provides recorded instructions and/or data to the computing device 900 for execution and/or processing. Examples of such storage media include magnetic tape, CD-ROM, DVD, Blu-ray Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 900. Examples of transitory or non-tangible computer readable transmission media that may also participate in the provision of software, application programs, instructions and/or data to the computing device 900 include radio or infra-red transmission channels as well as a network connection to another computer or networked device, and the Internet or Intranets including e-mail transmissions and information recorded on Websites and the like.

The computer programs (also called computer program code) are stored in primary memory 908 and/or secondary memory 910. Computer programs can also be received via the communication interface 924. Such computer programs, when executed, enable the computing device 900 to perform one or more features of embodiments discussed herein. In various embodiments, the computer programs, when executed, enable the processor 907 to perform features of the above-described embodiments. Accordingly, such computer programs represent controllers of the computer system 900.

Software may be stored in a computer program product and loaded into the computing device 900 using the removable storage drive 914, the storage drive 912, or the interface 920. The computer program product may be a non-transitory computer readable medium. Alternatively, the computer program product may be downloaded to the computer system 900 over the communications path 926. The software, when executed by the processor 907, causes the computing device 900 to perform functions of embodiments described herein.

It is to be understood that the embodiment of FIG. 9 is presented merely by way of example. Therefore, in some embodiments one or more features of the computing device 900 may be omitted. Also, in some embodiments, one or more features of the computing device 900 may be combined together. Additionally, in some embodiments, one or more features of the computing device 900 may be split into one or more component parts.

It will be appreciated by a person skilled in the art that numerous variations and/or modifications may be made to the present invention as shown in the specific embodiments without departing from the spirit or scope of the invention as broadly described. For example, the above description mainly presenting alerts on a visual interface, but it will be appreciated that another type of alert presentation, such as sound alert, can be used in alternate embodiments to implement the method. Some modifications, e.g., adding an access point, changing the log-in routine, etc. may be considered and incorporated. The present embodiments are, therefore, to be considered in all respects to be illustrative and not restrictive.

For example, the whole or part of the exemplary embodiments disclosed above can be described as, but not limited to, the following supplementary notes.

(Supplementary Note 1)

A method for adaptively controlling traffic signals based on a traffic control plan, comprising:
  identifying, by a processor, an external intervention occurring at an intersection, the external intervention causing traffic control behaviour at the intersection that deviates from the traffic control plan; and
  modifying, by the processor, the traffic control plan based on the traffic control behaviour caused by the external intervention.

(Supplementary Note 2)

The method according to Supplementary note 1, wherein identifying the external intervention comprises detecting a manual directing of traffic at the intersection using video analytics.

(Supplementary Note 3)

The method according to Supplementary note 1, wherein identifying the external intervention comprises detecting an anomaly in traffic flow pattern and other traffic variables at the intersection using machine learning.

(Supplementary Note 4)

The method according to Supplementary note 1, further comprising determining a control plan of the external intervention and a resultant traffic flow at the intersection based on the traffic control behaviour caused by the external intervention.

(Supplementary Note 5)

The method according to Supplementary note 4, further comprising:
  determining traffic flow at a neighbouring intersection of the intersection;
    generating one or more control plans for the neighbouring intersection from one or more simulations, the one or more simulations having simulation inputs based on variations of the control plan of the external intervention, the resultant traffic flow at the intersection and the traffic flow at the neighbouring intersection; and
  storing the generated one or more control plans as pre-learned control plans with their corresponding simulation inputs.

(Supplementary Note 6)

The method according to Supplementary note 4, further comprising:
  determining traffic flow at a neighbouring intersection of the intersection;
  retrieving a pre-learned control plan having inputs that match the control plan of the external intervention, the resultant traffic flow at the intersection and the traffic flow at the neighbouring intersection, the pre-learned control plan being an output of a simulation based on the inputs, the inputs comprising a variation of a control plan at the intersection, a resultant traffic flow at the intersection and a traffic flow at the neighbouring intersection; and
  applying the retrieved pre-learned control plan to the neighbouring intersection of the intersection.

(Supplementary Note 7)

The method according to Supplementary note 4, further comprising:
  determining traffic flow at a neighbouring intersection of the intersection; and
  determining an optimal control plan via fuzzy logic, the fuzzy logic being a non-linear mapping process that determines the optimal control plan based on the control plan of the external intervention, the resultant traffic flow at the intersection and the traffic flow at the neighbouring intersection, and applying the optimal control plan to the neighbouring intersection of the intersection, or storing the optimal control plan as a pre-learned control plan with the control plan of the external intervention, the resultant traffic flow at the intersection and the traffic flow at the neighbouring intersection as corresponding simulation inputs.

(Supplementary Note 8)

An apparatus for adaptively controlling traffic signals based on a traffic control plan, comprising:
  a memory in communication with a processor, the memory storing a computer program recorded therein, the computer program being executable by the processor to cause the apparatus at least to:
  identify an external intervention occurring at an intersection, the external intervention causing traffic control behaviour at the intersection that deviates from the traffic control plan; and
  modify the traffic control plan based on the traffic control behaviour caused by the external intervention.

(Supplementary Note 9)

The apparatus according to Supplementary note 8, wherein identifying the external intervention comprises detecting a manual directing of traffic at the intersection using video analytics.

(Supplementary Note 10)

The apparatus according to Supplementary note 8, wherein identifying the external intervention comprises detecting an anomaly in traffic flow pattern and other traffic variables at the intersection using machine learning.

(Supplementary Note 11)

The apparatus according to Supplementary note 8, wherein the memory and the computer program is executed by the processor to cause the apparatus further to:
  determine a control plan of the external intervention and a resultant traffic flow at the intersection based on the traffic control behaviour caused by the external intervention.

(Supplementary Note 12)

The apparatus according to Supplementary note 11, wherein the memory and the computer program is executed by the processor to cause the apparatus further to:
  determine traffic flow at a neighbouring intersection of the intersection;
  generate one or more control plans for the neighbouring intersection from one or more simulations, the one or more simulations having simulation inputs based on variations of the control plan of the external intervention, the resultant traffic flow at the intersection and the traffic flow at the neighbouring intersection; and store the generated one or more control plans as pre-learned control plans with their corresponding simulation inputs.

(Supplementary Note 13)

The apparatus according to Supplementary note 11, wherein the memory and the computer program is executed by the processor to cause the apparatus further to:

determine traffic flow at a neighbouring intersection of the intersection;

retrieve a pre-learned control plan having inputs that match the control plan of the external intervention, the resultant traffic flow at the intersection and the traffic flow at the neighbouring intersection, the pre-learned control plan being an output of a simulation based on the inputs, the inputs comprising a variation of a control plan at the intersection, a resultant traffic flow at the intersection and a traffic flow at the neighbouring intersection; and apply the retrieved pre-learned control plan to the neighbouring intersection of the intersection.

(Supplementary Note 14)

The apparatus according to Supplementary note 11, wherein the memory and the computer program is executed by the processor to cause the apparatus further to:

determine traffic flow at a neighbouring intersection of the intersection;

determine an optimal control plan via fuzzy logic, the fuzzy logic being a non-linear mapping process that determines the optimal control plan based on the control plan of the external intervention, the resultant traffic flow at the intersection and the traffic flow at the neighbouring intersection; and apply the optimal control plan to neighbouring intersections of the intersection, or store the optimal control plan as a pre-learned control plan with the control plan of the external intervention, the resultant traffic flow at the intersection and the traffic flow at the neighbouring intersection as corresponding simulation inputs.

(Supplementary Note 15)

A system for adaptively controlling traffic signals, comprising:

the apparatus as claimed in any one of Supplementary notes 8 to 14 and at least one image capturing device.

This application is based upon and claims the benefit of priority from Singapore Patent Application No. 10202109141Q, filed on Aug. 20, 2021, the disclosure of which is incorporated herein in its entirety by reference.

REFERENCE SIGNS LIST

102 intersection
200 Adaptive Traffic Signal Control (ATSC) system
202 Subsystem
204 Manual Directing Detection Module
206 Local region Signal Control Module
208 Traffic Sensor(s)
210 Analytic Module
212 Subsystem
214 Traffic Controller(s) Module
502 Cycle Duration
504 Turn Sequence
506 Green Light Duration
508 Amber Light Duration

What is claimed is:

1. A method for adaptively controlling traffic signals based on a traffic control plan, comprising:

identifying, by a processor, an external intervention occurring at an intersection, the external intervention causing traffic control behavior at the intersection that deviates from the traffic control plan; and modifying, by the processor, the traffic control plan based on the traffic control behavior caused by the external intervention;

determining a control plan of the external intervention and a resultant traffic flow at the intersection based on the traffic control behavior caused by the external intervention;

determining traffic flow at a neighboring intersection of the intersection;

generating one or more control plans for the neighboring intersection from one or more simulations, the one or more simulations having simulation inputs based on variations of the control plan of the external intervention, the resultant traffic flow at the intersection and the traffic flow at the neighboring intersection; and storing the generated one or more control plans as pre-learned control plans with their corresponding simulation inputs.

2. The method according to claim 1, wherein identifying the external intervention comprises detecting a manual directing of traffic at the intersection using video analytics.

3. The method according to claim 1, wherein identifying the external intervention comprises detecting an anomaly in traffic flow pattern and other traffic variables at the intersection using machine learning.

4. The method according to claim 1, further comprising:

determining traffic flow at a neighboring intersection of the intersection;

retrieving a pre-learned control plan having inputs that match the control plan of the external intervention, the resultant traffic flow at the intersection and the traffic flow at the neighboring intersection, the pre-learned control plan being an output of a simulation based on the inputs, the inputs comprising a variation of a control plan at the intersection, a resultant traffic flow at the intersection and a traffic flow at the neighboring intersection; and applying the retrieved pre-learned control plan to the neighboring intersection of the intersection.

5. The method according to claim 1, further comprising:

determining traffic flow at a neighboring intersection of the intersection; and determining an optimal control plan via fuzzy logic, the fuzzy logic being a non-linear mapping process that determines the optimal control plan based on the control plan of the external intervention, the resultant traffic flow at the intersection and the traffic flow at the neighboring intersection, and applying the optimal control plan to the neighboring intersection of the intersection, or storing the optimal control plan as a pre-learned control plan with the control plan of the external intervention, the resultant traffic flow at the intersection and the traffic flow at the neighboring intersection as corresponding simulation inputs.

6. An apparatus for adaptively controlling traffic signals based on a traffic control plan, comprising:

a memory in communication with a processor, the memory storing a computer program recorded therein, the computer program being executable by the processor to cause the apparatus at least to:

identify an external intervention occurring at an intersection, the external intervention causing traffic control behavior at the intersection that deviates from the traffic control plan; and modify the traffic control plan based on the traffic control behavior caused by the external intervention;

determine a control plan of the external intervention and a resultant traffic flow at the intersection based on the traffic control behavior caused by the external intervention;

determine traffic flow at a neighboring intersection of the intersection;

generate one or more control plans for the neighboring intersection from one or more simulations, the one or more simulations having simulation inputs based on variations of the control plan of the external intervention, the resultant traffic flow at the intersection and the traffic flow at the neighboring intersection; and store the generated one or more control plans as pre-learned control plans with their corresponding simulation inputs.

7. The apparatus according to claim 6, wherein identifying the external intervention comprises detecting a manual directing of traffic at the intersection using video analytics.

8. The apparatus according to claim 6, wherein identifying the external intervention comprises detecting an anomaly in traffic flow pattern and other traffic variables at the intersection using machine learning.

9. The apparatus according to claim 8, wherein the memory and the computer program is executed by the processor to cause the apparatus further to:

determine traffic flow at a neighboring intersection of the intersection;

retrieve a pre-learned control plan having inputs that match the control plan of the external intervention, the resultant traffic flow at the intersection and the traffic flow at the neighboring intersection, the pre-learned control plan being an output of a simulation based on the inputs, the inputs comprising a variation of a control plan at the intersection, a resultant traffic flow at the intersection and a traffic flow at the neighboring intersection; and apply the retrieved pre-learned control plan to the neighboring intersection of the intersection.

10. The apparatus according to claim 6, wherein the memory and the computer program is executed by the processor to cause the apparatus further to:

determine traffic flow at a neighboring intersection of the intersection;

determine an optimal control plan via fuzzy logic, the fuzzy logic being a non-linear mapping process that determines the optimal control plan based on the control plan of the external intervention, the resultant traffic flow at the intersection and the traffic flow at the neighboring intersection; and apply the optimal control plan to neighboring intersections of the intersection, or store the optimal control plan as a pre-learned control plan with the control plan of the external intervention, the resultant traffic flow at the intersection and the traffic flow at the neighboring intersection as corresponding simulation inputs.

11. A system for adaptively controlling traffic signals, comprising:

the apparatus as claimed in claim 6 and at least one image capturing device.

* * * * *